(12) United States Patent
Miyashita

(10) Patent No.: US 11,571,750 B2
(45) Date of Patent: Feb. 7, 2023

(54) LAMINATION MOLDING APPARATUS AND METHOD FOR PRODUCING THREE-DIMENSIONAL MOLDED OBJECT

(71) Applicant: Sodick Co., Ltd., Kanagawa (JP)

(72) Inventor: Yasuyuki Miyashita, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 122 days.

(21) Appl. No.: 17/145,400

(22) Filed: Jan. 11, 2021

(65) Prior Publication Data
US 2021/0402477 A1    Dec. 30, 2021

(30) Foreign Application Priority Data

Jan. 30, 2020 (JP) .............................. JP2020-013714

(51) Int. Cl.
*B22F 10/366*   (2021.01)
*B22C 19/02*    (2006.01)
(Continued)

(52) U.S. Cl.
CPC ............ *B22F 12/90* (2021.01); *B22C 5/0418* (2013.01); *B22C 19/02* (2013.01); *B22C 23/00* (2013.01);
(Continued)

(58) Field of Classification Search
CPC ........ B22F 10/366; B22F 10/28; B22F 10/31; B22F 12/33; B22F 12/41; B22F 12/48;
(Continued)

(56) References Cited

U.S. PATENT DOCUMENTS

| 8,070,474 | B2 | 12/2011 | Abe et al. |
| 2015/0367574 | A1 | 12/2015 | Araie et al. |
| 2017/0239752 | A1* | 8/2017 | Buller ................ B23K 26/0643 |

FOREIGN PATENT DOCUMENTS

| JP | 2001053358 A | * 2/2001 |
| JP | 5027780 | 9/2012 |

(Continued)

OTHER PUBLICATIONS (Google translation of patent document (JP2001053358 A) 2001 (Year: 2001).*

*Primary Examiner* — Michelle M Iacoletti
*Assistant Examiner* — Carlos Perez-Guzman
(74) *Attorney, Agent, or Firm* — JCIPRNET

(57) ABSTRACT

A lamination molding apparatus includes a molding room, a chamber, a chamber window, a molding table, a molding table driving device, surrounding walls, an irradiation device, a measuring unit, and a controller. The measuring unit includes a first measuring device acquiring a measured value of a light intensity, and a second measuring device acquiring a value of a beam diameter, and measures laser beams outputted based on set values of light intensity during molding. The controller determines an abnormality has occurred when a slope of a linear function obtained from a relationship between the measured value of the light intensity and the value of the beam diameter at a predetermined height is out of a predetermined range, or when a slope of a linear function obtained from a relationship between the measured value of the light intensity and a value of a focal position is out of a predetermined range.

12 Claims, 12 Drawing Sheets

(51) Int. Cl.
  *B22F 12/90* (2021.01)
  *B22C 5/04* (2006.01)
  *B33Y 50/02* (2015.01)
  *B33Y 10/00* (2015.01)
  *B33Y 30/00* (2015.01)
  *B22F 12/33* (2021.01)
  *B22F 12/49* (2021.01)
  *B22F 12/41* (2021.01)
  *B22F 12/48* (2021.01)
  *B22C 23/00* (2006.01)
  *G01J 1/42* (2006.01)
  *B22F 10/28* (2021.01)

(52) U.S. Cl.
  CPC ............ *B22F 10/366* (2021.01); *B22F 12/33* (2021.01); *B22F 12/41* (2021.01); *B22F 12/48* (2021.01); *B22F 12/49* (2021.01); *B33Y 10/00* (2014.12); *B33Y 30/00* (2014.12); *B33Y 50/02* (2014.12); *G01J 1/4257* (2013.01); *B22F 10/28* (2021.01)

(58) Field of Classification Search
  CPC .......... B22F 12/49; B22F 12/90; B22F 12/44; B22F 12/45; B22F 2999/00; B22C 5/0418; B22C 19/02; B22C 23/00; B33Y 10/00; B33Y 30/00; B33Y 50/02; G01J 1/4257; Y02P 10/25
  See application file for complete search history.

(56) References Cited

FOREIGN PATENT DOCUMENTS

| | | |
|---|---|---|
| JP | 2012187591 | 10/2012 |
| JP | 5863568 | 2/2016 |
| JP | 2017122265 | 7/2017 |
| JP | 2020139181 | 9/2020 |

\* cited by examiner

LAMINATION MOLDING APPARATUS AND METHOD FOR PRODUCING THREE-DIMENSIONAL MOLDED OBJECT

CROSS-REFERENCE TO RELATED APPLICATION

This application claims the priority benefit of Japan application serial no. 2020-013714, filed on Jan. 30, 2020. The entirety of the above-mentioned patent application is hereby incorporated by reference herein and made a part of this specification.

BACKGROUND

Technical Field

The disclosure relates to a lamination molding apparatus and a method for producing a three-dimensional molded object.

Description of Related Art

Lamination molding may be performed according to various methods. For example, a lamination molding apparatus which performs powder bed fusion forms a material layer in a predetermined molding region, and irradiates a laser beam to the material layer to form a solidified layer. The formation of the material layer and the formation of the solidified layer are repeated, and a predetermined number of solidified layers are laminated to form a desired three-dimensional molded object.

In such a lamination molding apparatus, the molding region is covered by a sealed chamber. The laser beam outputted from an irradiation device provided above the chamber passes through a chamber window provided on the upper surface of the chamber and is irradiated to the material layer formed in the molding region.

In an optical component through which the laser beam is transmitted, when the temperature of the portion through which the laser beam is transmitted is locally raised, a thermal lens effect in which the density and the refractive index change is generated. The thermal lens effect causes a focus shift in which the focal position of the laser beam moves above the desired position. If a large amount of focus shift occurs, it may not be possible to obtain a three-dimensional molded object of desired quality. When the optical component is contaminated, the thermal lens effect is likely to occur. For example, a fume generated at the time of irradiating the laser beam to the material layer to form the solidified layer adheres to the chamber window and makes the focus shift due to the thermal lens effect likely to occur.

To prevent the fume from adhering to the chamber window, U.S. Patent Application Laid-Open No. 2015/367574A1 discloses a lamination molding apparatus including a fume diffuser provided to cover a chamber window. The fume diffuser includes a cylindrical housing having an opening at the bottom. By supplying an inert gas to the fume diffuser, the part below the chamber window is filled with the inert gas, and a flow of the inert gas downward from the opening is formed. Accordingly, the fume is prevented from adhering to the chamber window.

Japanese Patent Application Laid-Open No. 2020-139181A discloses a lamination molding apparatus which measures the temperature of the chamber window to calculate the amount of deviation of the focal position of the laser beam, and replaces a chamber window when the amount of deviation reaches a predetermined threshold. With such a configuration, the chamber window is kept clean.

The chamber window is not the only optical component in which the thermal lens effect may occur. Therefore, by simply monitoring the chamber window, it may not be sufficient to detect the occurrence of the focus shift.

SUMMARY

One aspect of the disclosure provides a lamination molding apparatus including a molding room, a chamber, a chamber window, a molding table, a molding table driving device, surrounding walls, an irradiation device, a measuring unit, and a controller. The molding room has a molding region where a desired three-dimensional molded object is formed. The chamber covers the molding room. The chamber window is provided on an upper surface of the chamber. The molding table is provided in the molding region, and a material layer is formed on the molding table. The molding table driving device has an actuator which moves the molding table in a vertical direction. The surrounding walls surround the molding table in a moving range of the molding table. The irradiation device is provided above the chamber and includes a laser source which outputs a laser beam based on a set value of a light intensity, and a scanner which scans the laser beam and irradiates the laser beam to the material layer through the chamber window to form a solidified layer. The measuring unit includes a first measuring device having a first photodetector acquiring a measured value of the light intensity at a light detecting position of the laser beam, and a second measuring device having a second photodetector acquiring a value of a beam diameter at a light detecting position of the laser beam. The measuring unit measures each of a plurality of laser beams outputted based on a plurality of set values of the light intensity during molding. The controller is connected to the measuring unit and determines that an abnormality has occurred when a slope of a linear function obtained from a relationship between the measured value of the light intensity and the value of the beam diameter at a predetermined height is out of a predetermined range, or when a slope of a linear function obtained from a relationship between the measured value of the light intensity and a value of a focal position obtained from the beam diameter is out of a predetermined range.

Further, one aspect of the disclosure provides a method for producing a three-dimensional molded object, including the following steps. Each of a plurality of laser beams outputted based on a plurality of set values of the light intensity is measured during molding to acquire a measured value of the light intensity at a light detecting position and a value of a beam diameter at a light detecting position. It is determining that an abnormality has occurred when a slope of a linear function obtained from a relationship between the measured value of the light intensity and the value of the beam diameter at a predetermined height is out of a predetermined range, or when a slope of a linear function obtained from a relationship between the measured value of the light intensity and a value of a focal position obtained from the beam diameter is out of a predetermined range.

DESCRIPTION OF THE EMBODIMENTS

The disclosure provides a lamination molding apparatus and a method for producing a three-dimensional molded object which can more accurately recognize an abnormality in an optical system including a focus shift during molding.

According to one aspect of the disclosure, each of a plurality of laser beams outputted based on a plurality of set values of a plurality of the light intensity is measured during molding, and the measured value of the light intensity at the light detecting position and the value of the beam diameter at the light detecting position are acquired. Then, a linear function is calculated from the relationship between the measured value of the measured light intensity and the value of the beam diameter at the predetermined height, or a linear function is calculated from the relationship between the measured value of the measured light intensity and the value of the focal position obtained from the beam diameter. The presence or absence of an abnormality is determined according to the slope of the linear function obtained in this manner. Accordingly, it is possible to more accurately recognize an abnormality in the optical system including a focus shift during molding of the three-dimensional molded object.

Hereinafter, embodiments of the disclosure will be described with reference to the drawings. The various features shown in the embodiments below may be combined with each other.

Figure 1:
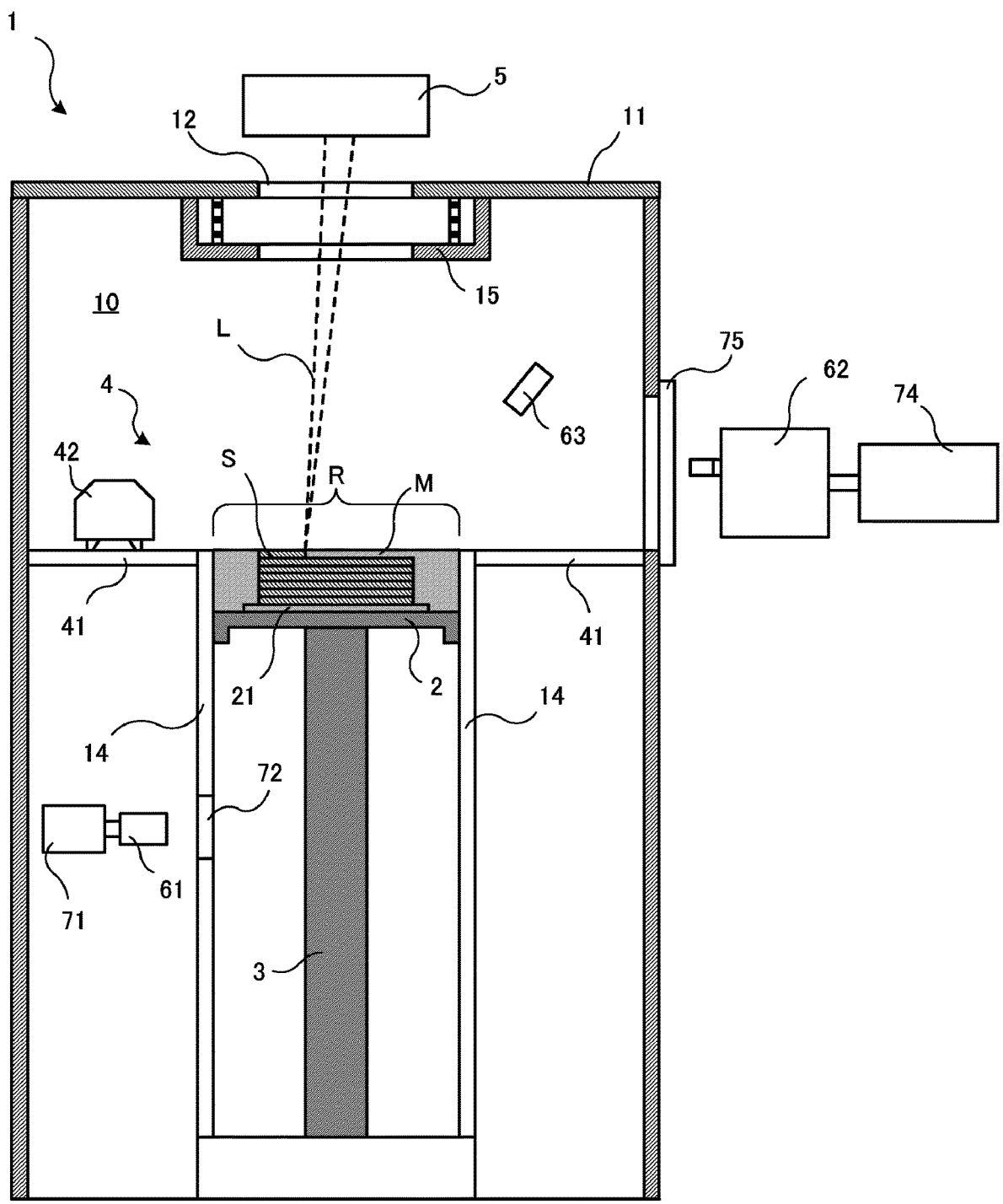
FIG. 1 is a schematic configuration view of a lamination molding apparatus according to an embodiment of the disclosure.

FIG. 1 is a view showing the configuration of a lamination molding apparatus 1 according to an embodiment of the disclosure. As shown in FIG. 1, the lamination molding apparatus 1 includes a chamber 11, a molding table 2, a material layer forming device 4, an irradiation device 5, a measuring unit 6, and a controller 8.

The chamber 11 covers a molding room 10 having a molding region R, which is a region where a desired three-dimensional molded object is formed. The lamination molding apparatus 1 may be provided with a machining device which performs cutting on a solidified layer S during or after molding. The machining device includes a machining head which holds a cutting tool, and the machining head is configured to be movable to any position in the molding room 10 by a machining head driving device. At this time, an inside of the chamber 11 may be divided into the molding room 10 and a drive room by a bellows or the like, and most of the machining head driving device may be housed in the drive room. In other words, of at least one space covered by the chamber 11, the space having the molding region R is referred to as the molding room 10.

The chamber 11 is configured to be substantially sealed. An inert gas of a predetermined concentration is supplied to the chamber 11. Further, the chamber 11 discharges the inert gas containing a fume generated at the time of solidification of a material layer M, i.e., at the time of sintering or melting. The inert gas discharged from the chamber 11 may be returned to the chamber 11 with the fume removed. Specifically, the chamber 11 is connected to an inert gas supplier (not shown) and a fume collector (not shown). The inert gas supplier is, for example, an inert gas generator which generates the inert gas from air or a gas cylinder in which the inert gas is stored, and the inert gas supplier supplies the inert gas of the predetermined concentration into the chamber 11. The fume collector is, for example, an electrostatic precipitator or a filter, and removes the fume from the inert gas discharged from the chamber 11 and then returns the inert gas into the chamber 11. In the disclosure, the inert gas is defined as a gas which does not substantially react with the material layer M or the solidified layer S, and an appropriate gas is selected from nitrogen gas, argon gas, helium gas, and the like according to the type of material.

The molding region R is provided with a molding table 2 on which the material layer M is formed. The molding table 2 can be moved in the vertical direction by a molding table driving device 3. When the three-dimensional molded object is to be formed, a base plate 21 may be placed on the molding table 2. At this time, a first layer of the material layer M is formed on the base plate 21. Surrounding walls 14 which surround the molding table 2 within a moving range of the molding table 2 are provided around the molding table 2.

A device including any actuator capable of reciprocating the molding table 2 along the vertical direction may be adopted as the molding table driving device 3. In this embodiment, the molding table driving device 3 includes a slide base provided right below the molding table 2, a ball screw, and a guide base which supports the ball screw. The ball screw includes a screw shaft which is rotated by a motor and a nut which is screwed to the screw shaft via balls. The nut is fixed to a side surface of the slide base.

The material layer forming device 4 is provided in the molding room 10. The material layer forming device 4 forms the material layer M having a predetermined thickness on the molding region R, i.e., on the molding table 2. The material layer forming device 4 may be any device that forms the material layer M, and the material layer forming device 4 of this embodiment includes a base 41 having the molding region R, a recoater head 42 arranged on the base 41 and configured to be movable in a horizontal uniaxial direction, and a recoater head driving device 43 which is any actuator that drives the recoater head 42. Blades are provided respectively on two side surfaces of the recoater head 42. The recoater head 42 is supplied with a metal material powder from a material supplier (not shown), and reciprocates in the horizontal uniaxial direction while discharging the material powder contained therein from a bottom surface. At this time, the blades flatten the discharged material powder to form the material layer M.

The irradiation device 5 is provided above the chamber 11 and irradiates a laser beam L to the material layer M to sinter or melt the material layer M to form the solidified layer S.

Figure 2:
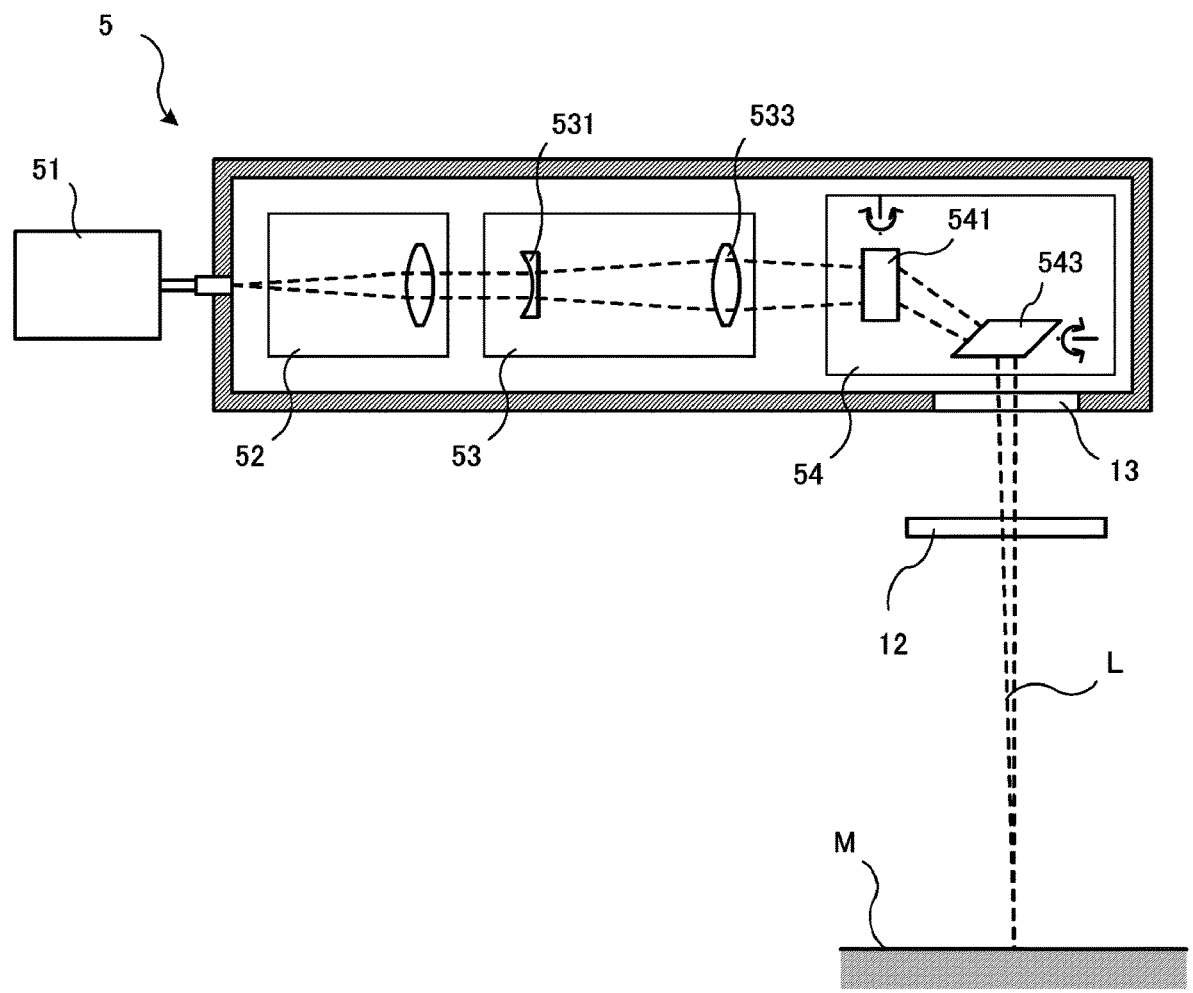
FIG. 2 is a schematic configuration view of an irradiation device.

As shown in FIG. 2, the irradiation device 5 includes a laser source 51, a collimator 52, a focus control unit 53, and a scanner 54.

The laser source 51 outputs the laser beam L based on a set value of the light intensity of the laser beam L. The laser beam L can sinter or melt the material layer M and is, for example, a $CO_2$ laser, a fiber laser, or a YAG laser. A transmission cable extending from the laser source 51 is provided with a connector having a quartz block at the tip and is connected to the collimator 52. The collimator 52 has a collimator lens and converts the laser beam L outputted from the laser source 51 into parallel light. The focus control unit 53 includes a movable lens 531 which adjusts a focal position of the laser beam L, a lens actuator 532 which moves the movable lens 531 in an optical axis direction of the laser beam L, and a condensing lens 533 which condenses the laser beam L that has passed through the movable lens 531, to adjust the laser beam L converted by the collimator 52 into parallel light to the laser beam L having a predetermined spot diameter. In this embodiment, the movable lens 531 is a diffusion lens, but may also be a condensing lens. The scanner 54 scans the laser beam L and irradiates the laser beam L to the material layer M to form the solidified layer S. The scanner 54 is specifically a galvanometer scanner having a first galvanometer mirror 541, a first mirror actuator 542 which rotates the first galvanometer mirror 541, a second galvanometer mirror 543, and a second mirror actuator 544 which rotates the second galvanometer mirror 543. By controlling the rotation angle of the first galvanometer mirror 541, an X-axis direction of the irradiation position of the laser beam L is controlled, and by controlling the rotation angle of the second galvanometer mirror 543, a Y-axis direction of the irradiation position of the laser beam L is controlled.

The laser beam L of which the irradiation position is controlled by the first galvanometer mirror 541 and the second galvanometer mirror 543 is irradiated to the material layer M on the molding table 2 through an irradiation device window 13 and a chamber window 12, which are transmission windows of the laser beam L, to form the solidified layer S. The irradiation device window 13 is provided on a lower surface of a housing below the scanner 54. The housing holds the collimator 52, the focus control unit 53, and the scanner 54. The chamber window 12 is provided on an upper surface of the chamber 11. The irradiation device window 13 and the chamber window 12 are formed of materials capable of transmitting the laser beam L. Specifically, the materials of the irradiation device window 13 and the chamber window 12 may be selected from, for example, quartz glass, borosilicate glass, or crystals of germanium, silicon, zinc selenide, or potassium bromide, depending on the type of the laser beam L. For example, when the laser beam L is a fiber laser or a YAG laser, the irradiation device window 13 and the chamber window 12 may be made of quartz glass.

Figure 3:
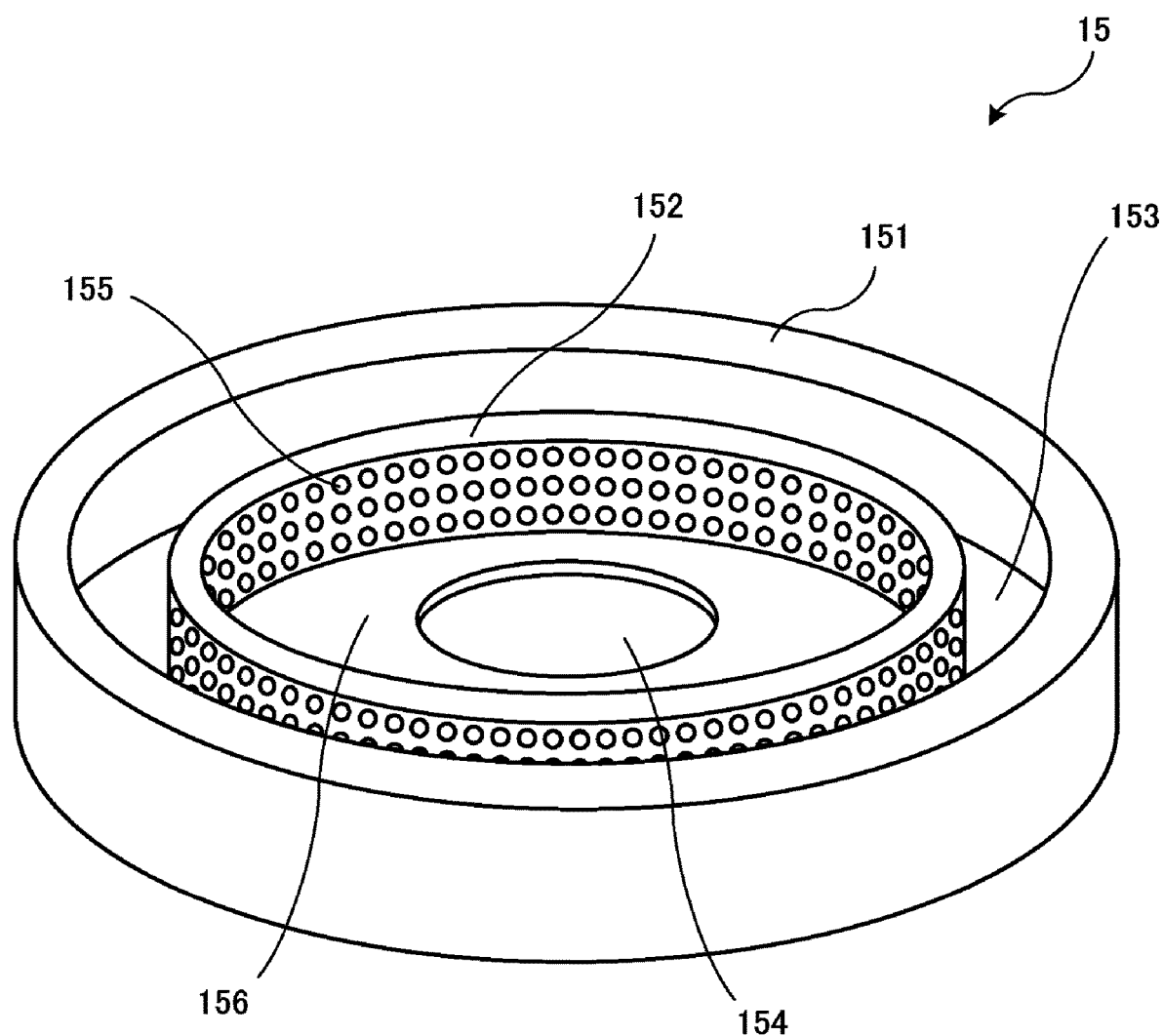
FIG. 3 is a schematic configuration view of a fume diffuser.

A fume diffuser 15 is provided on the upper surface of the chamber 11 to cover the chamber window 12. As shown in FIG. 3, the fume diffuser 15 includes a cylindrical housing 151 and a cylindrical diffusion member 152 arranged in the housing 151. An inert gas supply space 153 is provided between the housing 151 and the diffusion member 152. Further, on a bottom surface of the housing 151, an opening 154 is provided on an inner side of the diffusion member 152. The diffusion member 152 is provided with a large quantity of pores 155, and a clean inert gas supplied to the inert gas supply space 153 fills a cleaning room 156 through the pores 155. Then, the clean inert gas filled in the cleaning room 156 is ejected downward from the fume diffuser 15 through the opening 154. The fume diffuser 15 prevents the chamber window 12 from being contaminated by the fume generated when the solidified layer S is formed, and also helps eliminate the fume that is about to cross the irradiation path of the laser beam L from the irradiation path.

The configuration of the irradiation device 5 described above is merely an example and is not limited to this embodiment. Specifically, in this embodiment, the optical components in which the thermal lens effect may occur are specifically the quartz block, the collimator lens of the collimator 52, the movable lens 531 and the condensing lens 533 of the focus control unit 53, the irradiation device window 13, and the chamber window 12. Further, the optical system is a general term for members related to the irradiation of the laser beam L, and in this embodiment, it specifically refers to each member of the irradiation device 5, the irradiation device window 13 and the chamber window 12, and an irradiation controller 86.

The lamination molding apparatus 1 of this embodiment may include a temperature sensor 63 which measures a temperature of the chamber window 12. The temperature sensor 63 is, for example, infrared thermography. When the temperature sensor 63 is infrared thermography, the temperature sensor 63 acquires a maximum temperature of the chamber window 12 on a surface of the molding room 10 side as the temperature of the chamber window 12. As the solidified layer S is formed by the laser beam L, when the temperature of the chamber window 12 exceeds a predetermined threshold value determined according to laser conditions such as the set value of the light intensity of the laser beam L, it is determined that the chamber window 12 is contaminated by the fume or the like.

Figure 4:
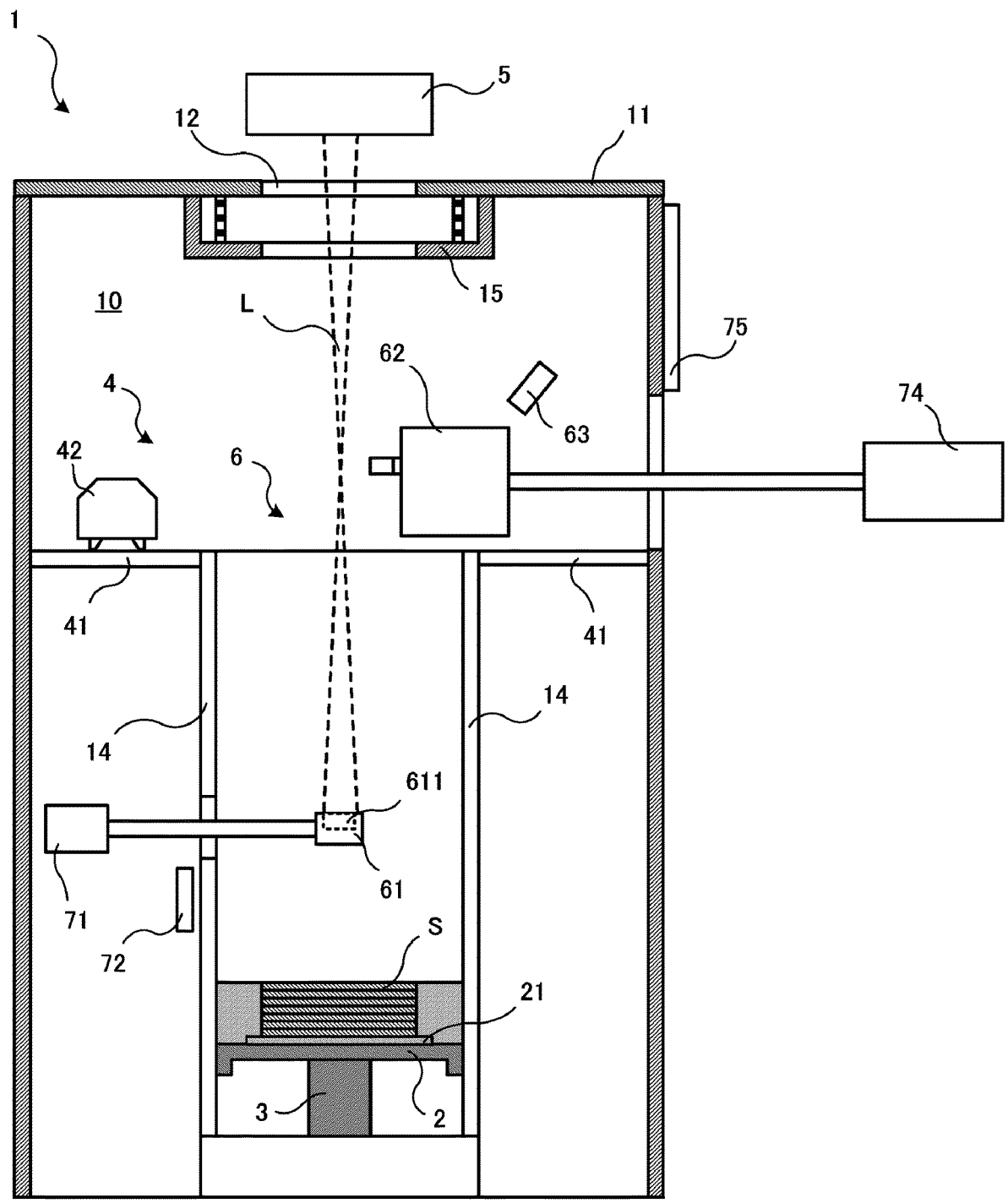
FIG. 4 shows an example of arrangement of a measuring unit at the time of measurement performed by a first measuring device.
Figure 5:
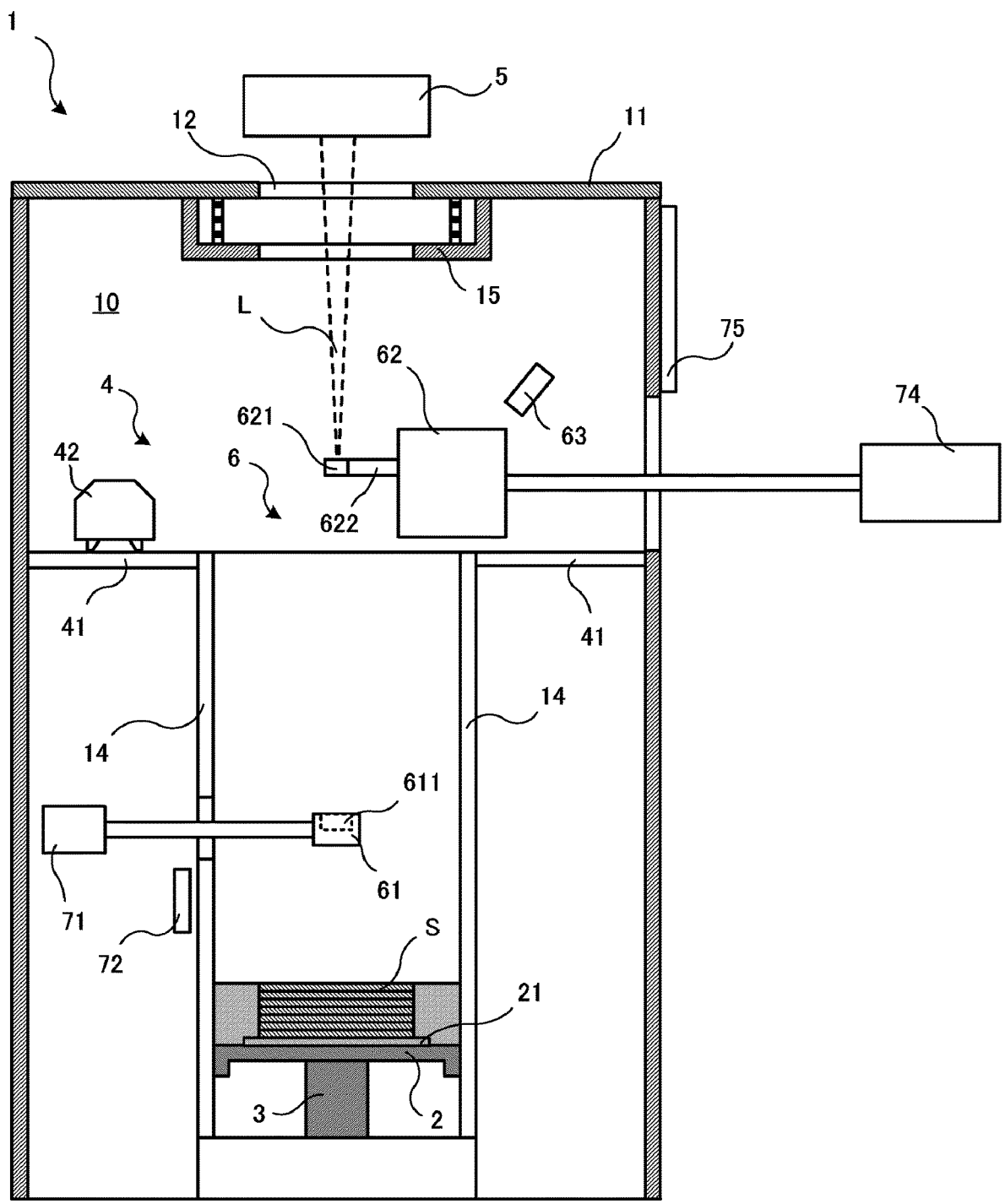
FIG. 5 shows an example of arrangement of the measuring unit at the time of measurement performed by a second measuring device.

The measuring unit 6 measures each of a plurality of laser beams L outputted based on a plurality of the set values the light intensity during molding of the three-dimensional molded object. As shown in FIG. 4 and FIG. 5, the measuring unit 6 includes a first measuring device 61 and a second measuring device 62. FIG. 4 shows a state in which the laser beam L is measured by the first measuring device 61, and FIG. 5 shows a state in which the laser beam L is measured by the second measuring device 62.

To prevent interference with the recoater head 42, the machining head, the laser beam L, or the like during molding, and contamination by the material powder or the fume, the measuring unit 6 may be moved into the molding room 10 only during measurement. A first carrier 71 which moves the first measuring device 61 and a second carrier 74 which moves the second measuring device 62 are provided as carriers for moving the measuring unit 6. The carrier may be a device which includes any actuator. The carrier may be, for example, a ball screw having a screw shaft which is rotated by a motor and a nut which is screwed with the screw shaft via balls and connected to each measuring unit 6. Further, while the carrier is configured to move the measuring unit 6 only in the horizontal direction in this embodiment, the carrier may be configured to be moved not only in the horizontal direction but also in the vertical direction. A shutter which is openable and closable is provided at an opening formed in at least one of the chamber 11 and the surrounding walls 14 as a transport port of the measuring unit 6. In this embodiment, a first shutter 72 is provided on the surrounding wall 14, and a second shutter 75 is provided on a side wall of the chamber 11. The shutter may be configured to slide in the vertical direction, the horizontal direction, or the vertical/horizontal directions, and may be configured to rotate. A first shutter driving device 73 for opening and closing the first shutter 72 and a second shutter driving device 76 for opening and closing the second shutter 75 may be any actuator. The first shutter driving device 73 and the second shutter driving device 76 may be, for example, fluid pressure cylinders or electric cylinders. It is noted that "during molding" is a period from the start to the end of molding a three-dimensional molded object, and more specifically, it means from the start of execution of a predetermined project file to the end of the formation of a final solidified layer S.

The first measuring device 61 has a first photodetector 611 which acquires a measured value of the light intensity at a light detecting position of the laser beam L. For example, a power meter, or more specifically, a thermopile sensor type power meter, may be used as the first measuring device 61. After receiving the laser beam L, the first photodetector 611 generates heat and outputs, as an electric signal, a measured value of the light intensity according to the amount of heat generation. The first measuring device 61 is transported inside and outside the molding room 10 by the first carrier 71. During this transportation, the first shutter 72 is opened and closed.

To prevent damage to the first photodetector 611, the laser beam L in the first photodetector 611 may be in a sufficiently defocused state. In other words, the first photodetector 611 may be arranged at a sufficiently lower side. In this embodiment, the first photodetector 611 is arranged in a space surrounded by the surrounding walls 14 at the time of measurement. At this time, the molding table 2 is lowered by the molding table driving device 3 so that the first measuring device 61 does not interfere with the molding table 2, the solidified layer S, or the like.

The second measuring device 62 has a second photodetector 621 which acquires a value of the beam diameter at the light detecting position of the laser beam L. The second photodetector 621 may be further configured to be able to acquire an intensity distribution, i.e., a beam profile, at the light detecting position of the laser beam L. The second measuring device 62 is, for example, a focus monitor. In this embodiment, the second photodetector 621 is held by an arm 622 which can move back and forth (left-right direction in FIG. 5). The second photodetector 621 may be configured to be movable in the vertical direction. For example, the second measuring device 62 may have an actuator which moves the second photodetector 621 in the vertical direction, or the entirety of the second measuring device 62 may be moved in the vertical direction by the second carrier 74. In this embodiment, the arm 622 moves in the vertical direction, so that the second photodetector 621 is moved in the vertical direction. By configuring the second photodetector 621 to be movable in the vertical direction, during molding, the second measuring device 62 can measure the values of the beam diameter and the intensity distribution at a plurality of heights for the laser beam L outputted based on the set value of the predetermined light intensity. The focal position is calculated based on the data of the beam diameter at the plurality of heights. The second measuring device 62 is transported inside and outside the molding room 10 by the second carrier 74. During this transportation, the second shutter 75 is opened and closed.

Figure 6:
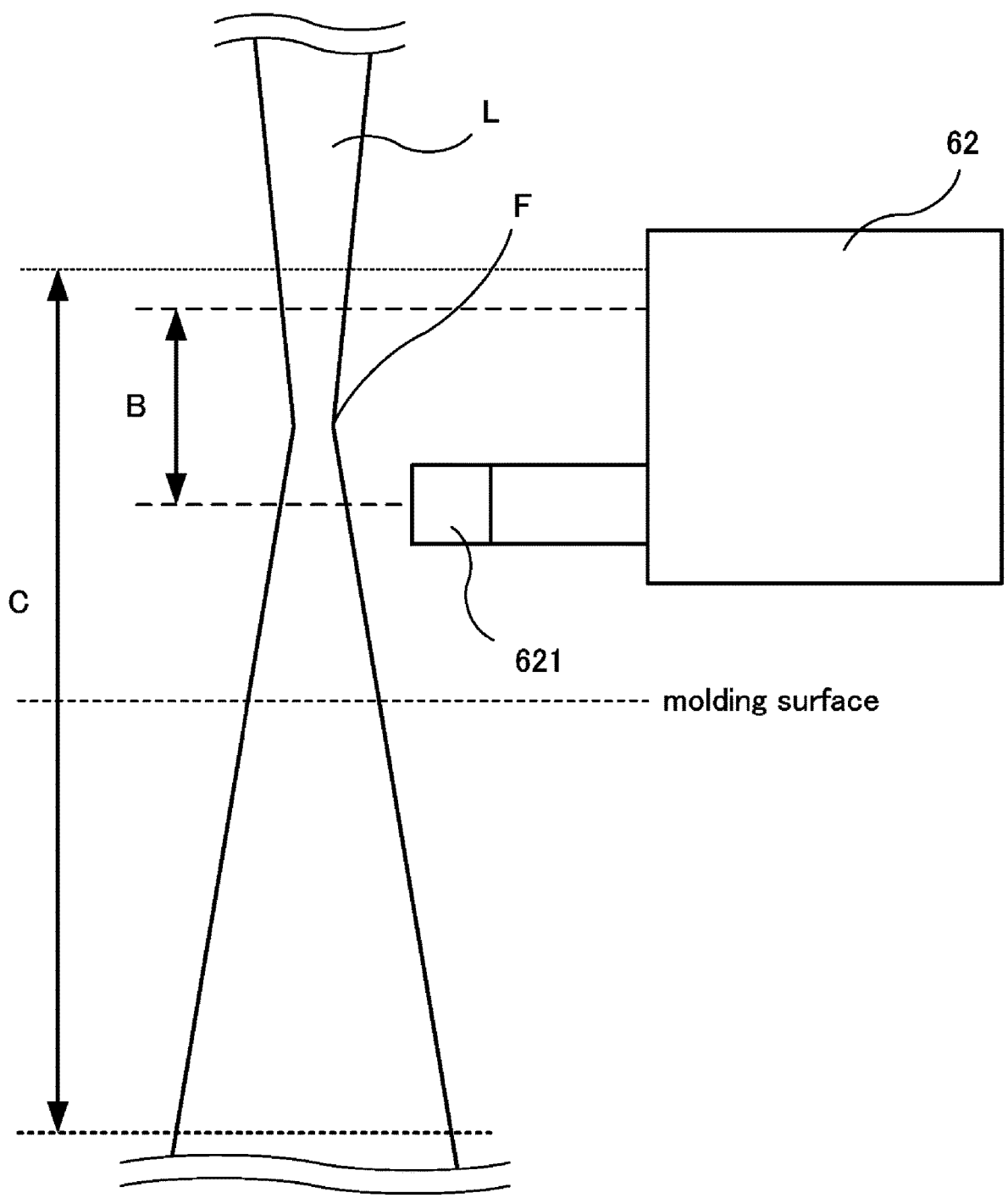
FIG. 6 shows a moving range of a second photodetector and an adjustment range of a focal position of a laser beam L.

When the second photodetector 621 is configured to be movable in the vertical direction, at the time of measurement, the focus control unit 53 may adjust the focal position of the laser beam L measured by the second measuring device 62 to be within a vertical movable range of the second photodetector 621. Accordingly, the focal position can be acquired more accurately. In other words, when the focal position is acquired accurately, the vertical movable range of the second photodetector 621 indicated by an arrow B in FIG. 6 and an adjustable range of the focal position of the laser beam L indicated by an arrow C may partially overlap. Since the focal position of the laser beam L may move above the set position owing to the focus shift, the second photodetector 621 may be configured to be movable within a range sufficient to acquire the focal position of the focus-shifted laser beam L.

To perform the measurement more accurately, an incident angle of the laser beam L measured by the measuring unit 6 may be 90° with respect to the horizontal direction. In this embodiment, when the laser beam L is irradiated to the center of the molding table 2, the incident angle of the laser beam L is 90°. Therefore, in this embodiment, at the time of measurement, the light detecting positions of the first photodetector 611 and the second photodetector 621 are on the central axis of the molding table 2.

Further, the first measuring device 61 and the second measuring device 62 may be configured to be integrated together. In other words, a device having the first photodetector 611 which acquires the measured value of the light intensity at the light detecting position of the laser beam L, and the second photodetector 621 which acquires the value of the beam diameter at the light detecting position of the laser beam L may be used as the measuring unit 6 which serves as both the first measuring device 61 and the second measuring device 62.

Figure 7:
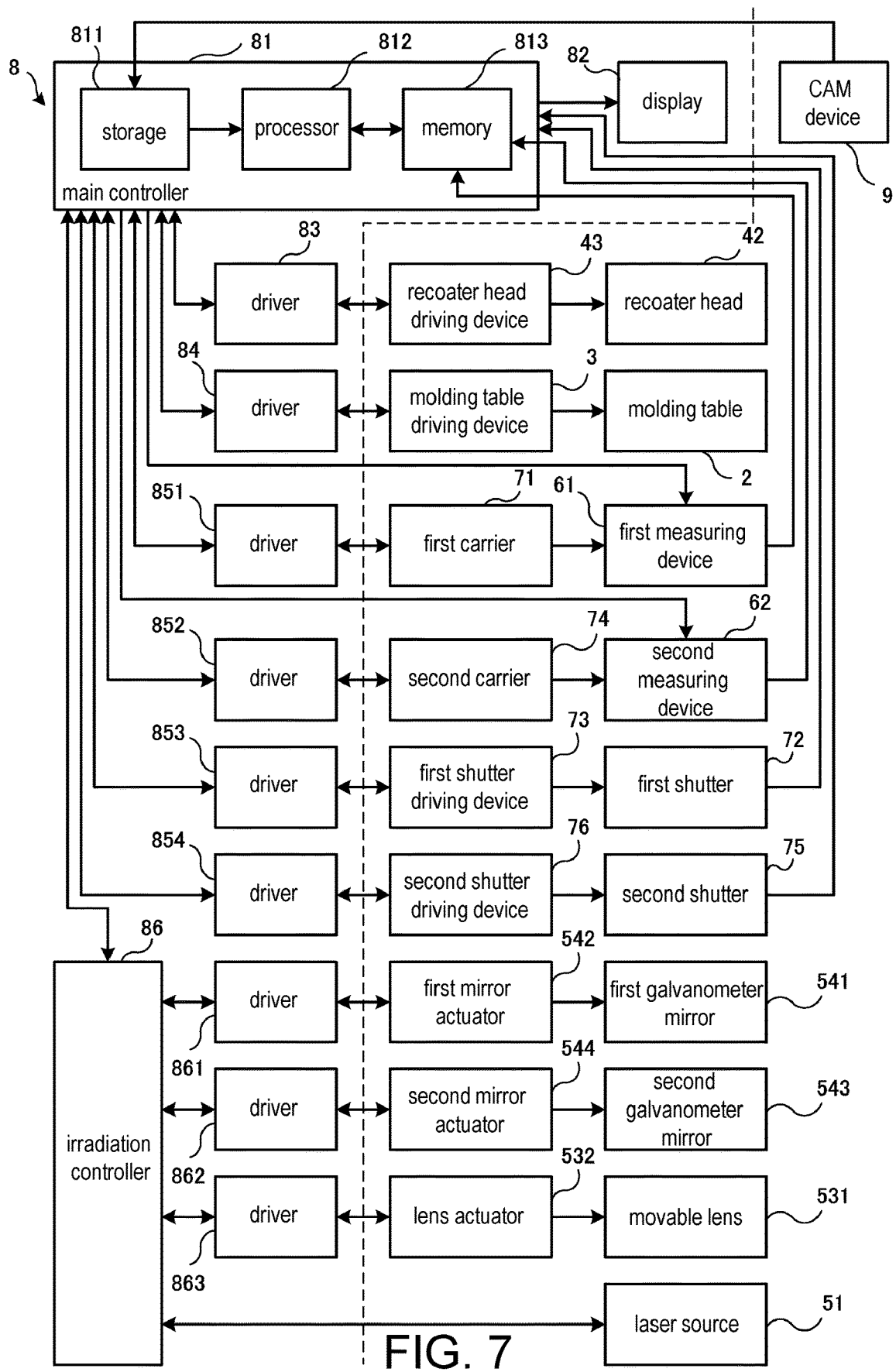
FIG. 7 is a block diagram of a controller.

Next, the controller 8 which controls the lamination molding apparatus 1 will be described. As shown in FIG. 7, the controller 8 includes a main controller 81, a display 82, an irradiation controller 86, and drivers 83, 84, 851, 852, 853, 854, 861, 862, and 863.

The controller 8 controls each member of the lamination molding apparatus 1. Further, the controller 8 is connected to the first measuring device 61 and the second measuring device 62, which are the measuring unit 6, and the temperature sensor 63, respectively. The controller 8 operates the first measuring device 61, the second measuring device 62, and the temperature sensor 63, and acquires and analyzes measurement data to determine whether there is an abnormality in the optical system.

According to the project file created by a CAM device 9, the main controller 81 controls the material layer forming device 4, the molding table 2, the first measuring device 61, the second measuring device 62, the first carrier 71, the second carrier 74, the first shutter 72, the second shutter 75, the temperature sensor 63, and the like. In addition, the main controller 81 transmits a molding program to the irradiation controller 86. The main controller 81 has a storage 811, a processor 812, and a memory 813.

The CAM device 9 creates the project file including a main program for forming the desired three-dimensional molded object and the molding program. The main program is configured by a plurality of program lines numbered with sequence numbers, and each program line includes a command for sintering or melting in a predetermined layer, a command related to determination of the optical system performed by the measuring unit 6, and the like. Further, the molding program includes commands of the irradiation position of the laser beam L and the like.

The storage 811 stores the project file acquired from the CAM device 9 via a communication line or a portable storage medium.

The processor 812 analyzes the project file stored in the storage 811 and performs computational processing for controlling the material layer forming device 4, the molding table 2, and the like.

The memory 813 temporarily stores numerical values and data which need to be temporarily stored in the process of the computational processing performed by the processor 812.

The memory 813 stores the data acquired by the first measuring device 61, the second measuring device 62, and the temperature sensor 63. The processor 812 analyzes the data and performs determination on whether there is an abnormality in the optical system. In other words, in this embodiment, a determination section related to the determination of the optical system is specifically the processor 812 and the memory 813 of the main controller 81. However, the controller 8 may also have a processor and a memory provided separately from the main controller 81 as the determination section.

The display 82 is connected to the main controller 81 and displays data, an error message, or the like notified by the main controller 81. When an abnormality in the optical system is detected, the error message related to the abnormality may be displayed on the display 82.

The driver 83 supplies the required driving current to the recoater head driving device 43 based on the command from the main controller 81. Further, the main controller 81 performs feedback control based on an operation signal inputted from the recoater head driving device 43 via the driver 83.

The driver 84 supplies the required driving current to the molding table driving device 3 based on the command from the main controller 81. Accordingly, the motor of the molding table driving device 3 rotates, and the molding table 2 moves upward or downward. Further, the main controller 81 performs feedback control based on an operation signal inputted from the molding table driving device 3 via the driver 84. The controller 8 moves the molding table 2 vertically downward when the measuring unit 6 performs measurement of the laser beam L.

Based on the commands from the main controller 81, the drivers 851, 852, 853, and 854 respectively supply the required driving currents to the first carrier 71, the second carrier 74, the first shutter driving device 73, and the second shutter driving device 76. In addition, the main controller 81 performs feedback control respectively based on operation signals inputted from the first carrier 71 and the second carrier 74 via the drivers 851 and 852. The first shutter driving device 73 and the second shutter driving device 76 may be feedback-controlled when the driving source is electric, and may be open-controlled when the driving source is fluid pressure. In other words, the main controller 81 may perform feedback control respectively based on operation signals inputted from the first shutter driving device 73 and the second shutter driving device 76 via the drivers 853 and 854, or may also perform open control. Further, a limit switch may be provided for detecting the opening and closing of the first shutter 72 and the second shutter 75, respectively. When measurement of the laser beam L is performed by the first measuring device 61 and the second measuring device 62 based on the command from the main controller 81, the first shutter 72 and the second shutter 75 are opened, and the first carrier 71 and the second carrier 74 are moved from the outside of the molding room 10 to the inside of the molding room 10. Further, after the measurement of the laser beam L performed by the first measuring device 61 and the second measuring device 62, the first carrier 71 and the second carrier 74 are moved from the inside of the molding room 10 to the outside of the molding room 10, and the first shutter 72 and the second shutter 75 are closed.

The irradiation controller 86 receives the molding program from the main controller 81, and sends commands to the driver 861, the driver 862, and the driver 863 based on the molding program. Further, the irradiation controller 86 sends a command to the laser source 51 to control the intensity of the laser beam L and switch-on/off of the laser beam L.

The driver 861 supplies the required driving current to the scanner 54 of the irradiation device 5 based on the command from the irradiation controller 86. In the scanner 54, the first mirror actuator 542 operates according to the driving current from the driver 861, and the first galvanometer mirror 541 rotates.

The driver 862 supplies the required driving current to the scanner 54 of the irradiation device 5 based on the command from the irradiation controller 86. In the scanner 54, the second mirror actuator 544 operates according to the driving current from the driver 862, and the second galvanometer mirror 543 rotates.

The driver 863 supplies the required driving current to the focus control unit 53 of the irradiation device 5 based on the command from the irradiation controller 86. In the focus control unit 53, the lens actuator 532 operates according to the driving current from the driver 863, and the movable lens 531 moves.

Herein, a determination method of the optical system will be described. In this embodiment, specifically, determination based on the measured value of the light intensity and the value of the beam diameter at a predetermined height or the value of the focal position, determination based on the set value and the measured value of the light intensity, determination based on the intensity distribution, and determination based on the temperature of the chamber window 12 are performed.

First, the determination method based on the measured value of the light intensity and the value of the beam diameter at a predetermined height or the value of the focal position will be described. As the light intensity increases, the amount of heat absorbed by the optical component increases, so that the focus shift due to the thermal lens effect is likely to occur. In addition, as the degree of contamination of the optical component increases, the amount of heat absorbed by the optical component increases, so that the focus shift due to the thermal lens effect is likely to occur. That is, there is a correlation between {(increase in focal position)/(increase in measured value of light intensity)} and {(increase in beam diameter)/(increase in measured value of light intensity)}, and the degree of contamination of the optical component.

The irradiation device 5 irradiates the laser beam L to the first measuring device 61 and the second measuring device 62 respectively based on at least of two set values of the light intensity. The light intensity may be set to a value lower than that at the time of forming the solidified layer S, and is set to a value not exceeding the measurable ranges of the first photodetector 611 and the second photodetector 621. For example, the light intensity of the laser beam L is set to a range of 200 W or less. The first measuring device 61 acquires the measured value of the light intensity of the laser beam L and outputs the data to the memory 813. The second measuring device 62 acquires the value of the beam diameter at a predetermined height or the value of the focal position of the laser beam L and outputs the data to the memory 813. In the case where the second measuring device 62 acquires the beam diameter at a predetermined height, the second photodetector 621 is fixed in the vertical direction or is positioned at the predetermined height. In the case where the second measuring device 62 acquires the value of the focal position, the second photodetector 621 receives the laser beam L at a plurality of heights, and the height at which the beam diameter is the smallest is taken as the focal position.

The processor 812 calculates a linear function based on the measured value of the light intensity measured by the first measuring device 61, and one of the value of the beam diameter at the predetermined height and the value of the focal position obtained from the beam diameter as measured by the second measuring device 62. The linear function is obtained, for example, by linear approximation by the least squares method. When the slope of the linear function is out of a predetermined range (e.g., when the slope exceeds a predetermined threshold in the case of taking the measured value of light intensity as the x-axis and the value of the focal position or the value of the beam diameter as the y-axis), it is determined that an abnormality occurs in the optical system, and more specifically, a focus shift exceeding a tolerance occurs. It is considered that the cause of the focus shift is that the chamber window 12 or the optical component(s) other than the chamber window 12 is contaminated.

Figure 8A:
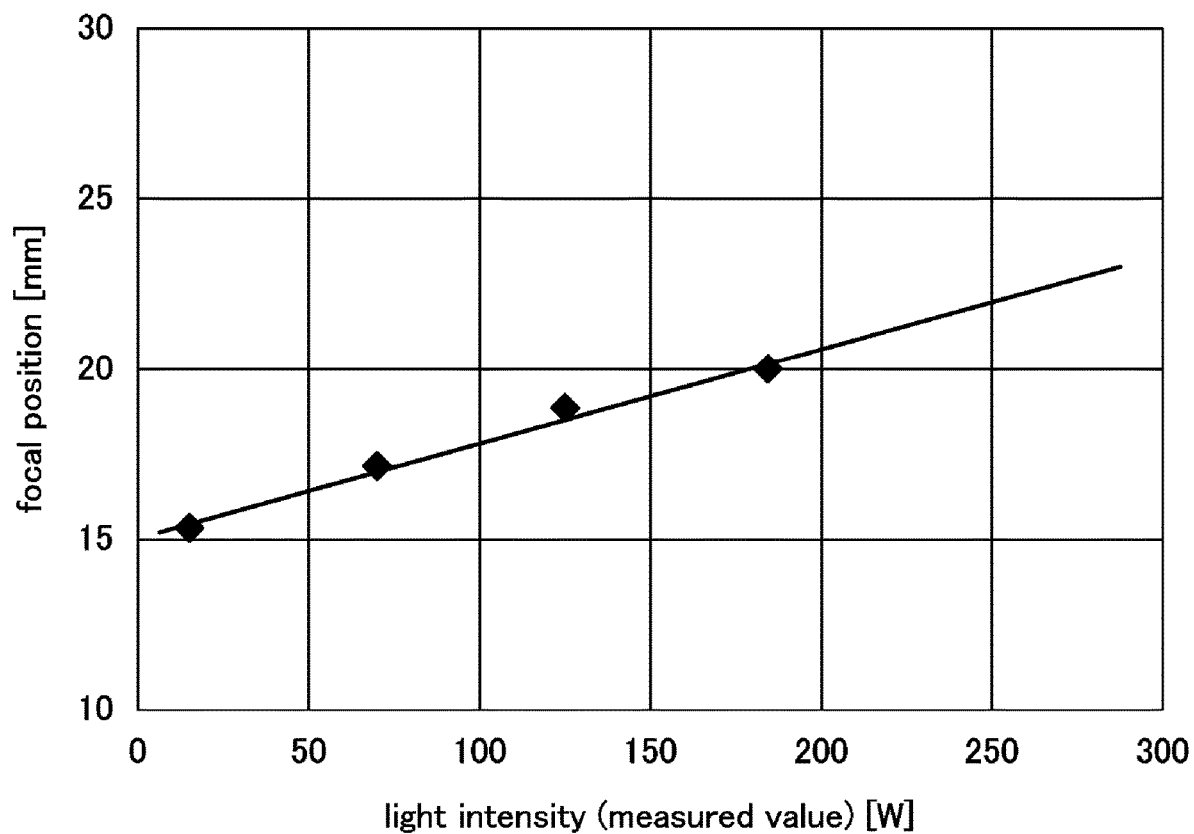
FIG. 8A is a graph of a linear function obtained from the light intensity and the focal position.
Figure 8B:
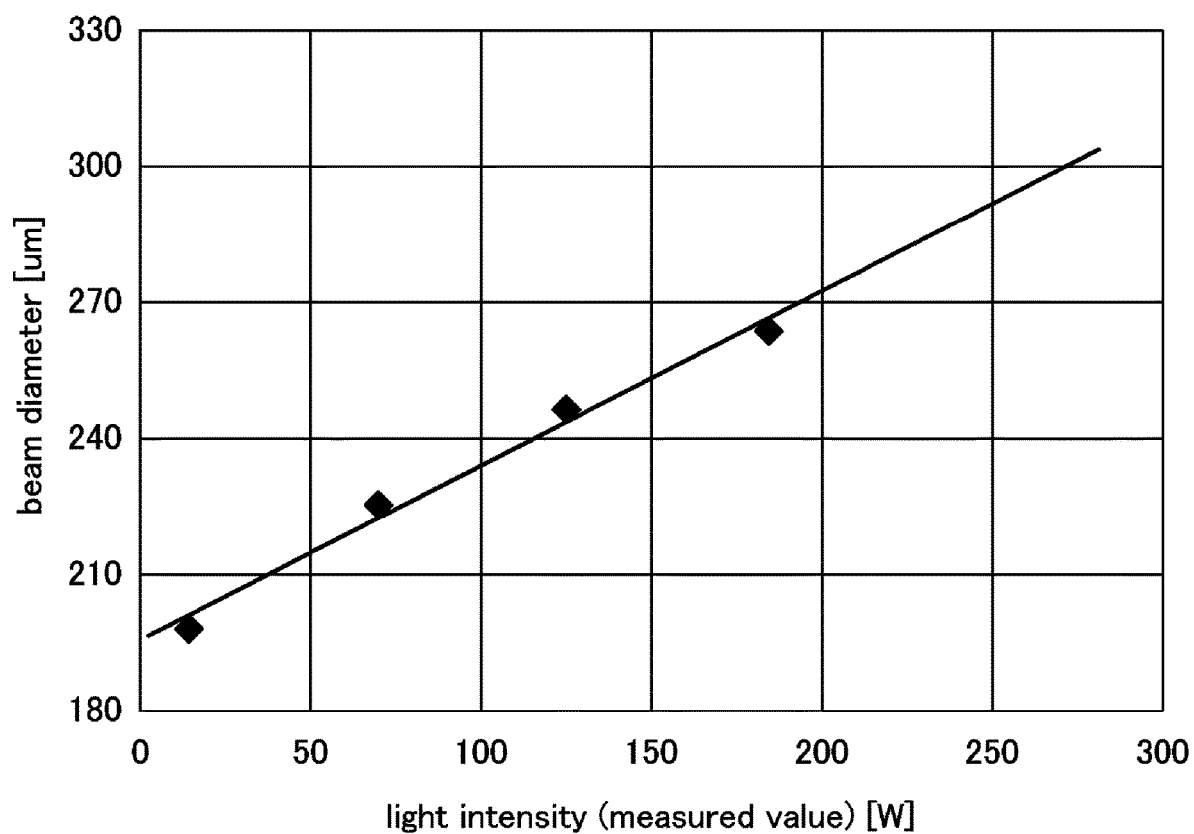
FIG. 8B is a graph of a linear function obtained from the light intensity and the beam diameter.

In the examples shown in FIG. 8A and FIG. 8B, the first measuring device 61 and the second measuring device 62 acquired the value of the beam diameter or the value of the focal position of the laser beam L set to 15 W, 70 W, 126 W, and 182 W, respectively. In the vicinity of the focal position, there may be slight deviation in the proportional relationship between the measured value of the light intensity and the beam diameter. Therefore, when acquiring the beam diameter at a predetermined height, measurement may be performed at a position slightly deviated from the focal position. For example, in this embodiment, the beam diameter at the focal position is about 100 μm, but the beam diameter may be measured at a position where the beam diameter is about 130 μm or more.

Next, the determination method based on the set value and the measured value of the light intensity will be described. The irradiation device 5 irradiates the laser beam L to the first measuring device 61 based on at least one set value of the light intensity. The light intensity may be set to a value lower than that at the time of forming the solidified layer S, and is set to a range not exceeding the measurable range of the first photodetector 611. For example, the light intensity of the laser beam L is set to a range of 200 W or less. The first measuring device 61 acquires the measured value of the light intensity of the laser beam L and outputs the data to the memory 813. The processor 812 compares the set value of the light intensity of the laser beam L, which is arbitrarily set, with the measured value of the light intensity of the laser beam L. Then, when the absolute value of a difference between the set value of the light intensity and the measured value of the light intensity exceeds a predetermined threshold value, it is determined that an abnormality has occurred in the optical system. It is considered that the reason why the desired light intensity is not obtained lies in attenuation of the laser beam L due to contamination of the optical component(s), failure of the laser source 51, an abnormality of the output or input of the command between the irradiation controller 86 and the laser source 51, or the like.

In addition, the determination based on the measured value of the light intensity and the value of the beam diameter at a predetermined height or the value of the focal position, and the determination based on the set value and the measured value of the light intensity may be performed in parallel.

Then, the determination method based on the intensity distribution will be described. The irradiation device 5 irradiates the laser beam L based on a predetermined set value of the light intensity. To measure the intensity distribution more accurately, the light intensity may be set to a small value, at which the focus shift can hardly occur, within a measurable range. For example, the light intensity of the laser beam L is set to about 10 W to 20 W. The second photodetector 621 of the second measuring device 62 acquires the value of the beam diameter and the intensity distribution at the light detecting position of the laser beam L at at least one height. The second photodetector 621 may be moved vertically at a predetermined pitch to acquire the value of the beam diameter and the intensity distribution at each of a plurality of heights. Also, in the case of acquiring the intensity distribution at one height, the focal position of the laser beam L at the time of measurement may be adjusted so that the beam diameter at the light detecting position of the second photodetector 621 is substantially consistent with the beam diameter at a molding surface at the time of forming the solidified layer S. The molding surface is an upper surface of the material layer M at the time of forming the solidified layer S. Accordingly, it is possible to acquire data of the intensity distribution closer to the laser beam L at the molding surface at the time of forming the solidified layer S. The second measuring device 62 outputs the data of the value of the beam diameter and the intensity distribution of the laser beam L to the memory 813. The intensity distribution is, for example, the distribution of the light intensity in the XY directions. A reference range of the intensity distribution at each beam diameter of the laser beam L is stored in advance in the storage 811. In other words, when the optical system is in a normal state, for the laser beam L set to the same light intensity used for measurement, the intensity distribution at each beam diameter is measured, and the reference range is calculated based on the intensity distribution. The processor 812 compares the intensity distribution at each measured beam diameter with the reference range, and, if it does not fall within the reference range, it is determined that an abnormality has occurred. It is considered that the cause of the abnormality of the intensity distribution lies in failure of the laser source 51 or the scanner 54.

The determination based on the measured value of the light intensity and the value of the beam diameter at a predetermined height or the value of the focal position, the determination based on the set value and the measured value of the light intensity, and the determination based on the intensity distribution are performed at any timing during molding. For example, the determinations may be performed each time a predetermined time elapses after the start of molding, the determinations may be performed each time a predetermined number of solidified layers S are formed, or the determinations may be performed each time a cumulative area of the solidified layers S reaches a predetermined value. In addition, the determination may be performed immediately after the start of molding.

The determination based on the temperature of the chamber window 12 is performed in parallel with the formation of the solidified layer S. When the solidified layer S is formed, the temperature sensor 63 acquires the temperature of the chamber window 12 and outputs the data to the memory 813. The processor 812 compares the temperature of the chamber window 12 with a predetermined threshold value determined according to set values of laser conditions such as the light intensity of the laser beam L. When the temperature of the chamber window 12 exceeds the threshold value, it is determined that the chamber window 12 is contaminated.

By combining the above determination methods, the cause of the abnormality in the optical system can be identified more accurately. For example, when the focus shift occurs but the temperature of the chamber window 12 is normal, it can be estimated that the optical component(s) other than the chamber window 12 is contaminated.

When the abnormality in the optical system is detected, the controller 8 may stop the molding and display the error message on the display 82. Further, when a sign of abnormality is detected to some extent, a warning may be displayed on the display 82 to prompt the operator for confirmation.

Figure 9:
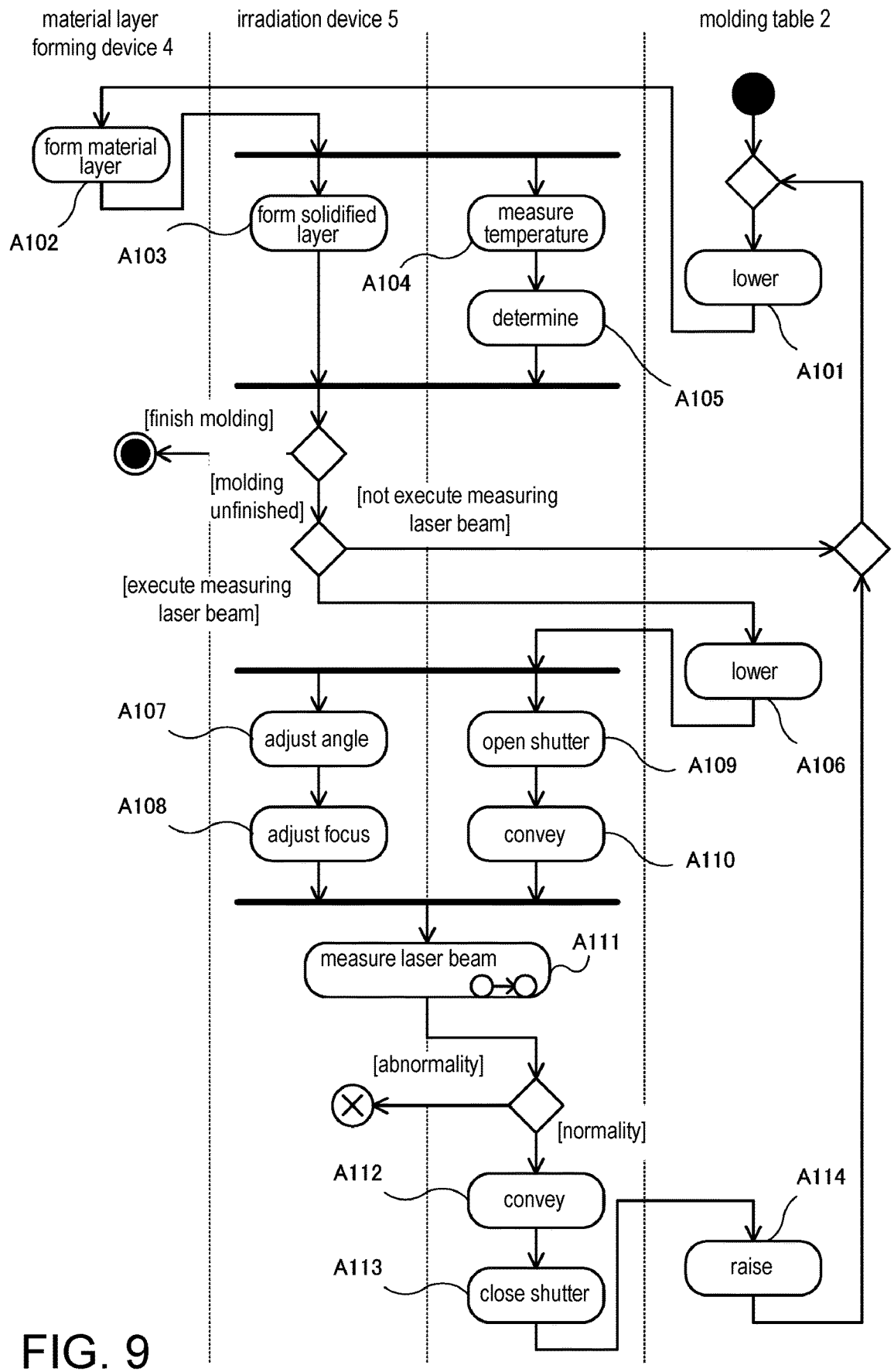
FIG. 9 is an activity diagram showing a flow of operations of lamination molding.
Figure 10A:
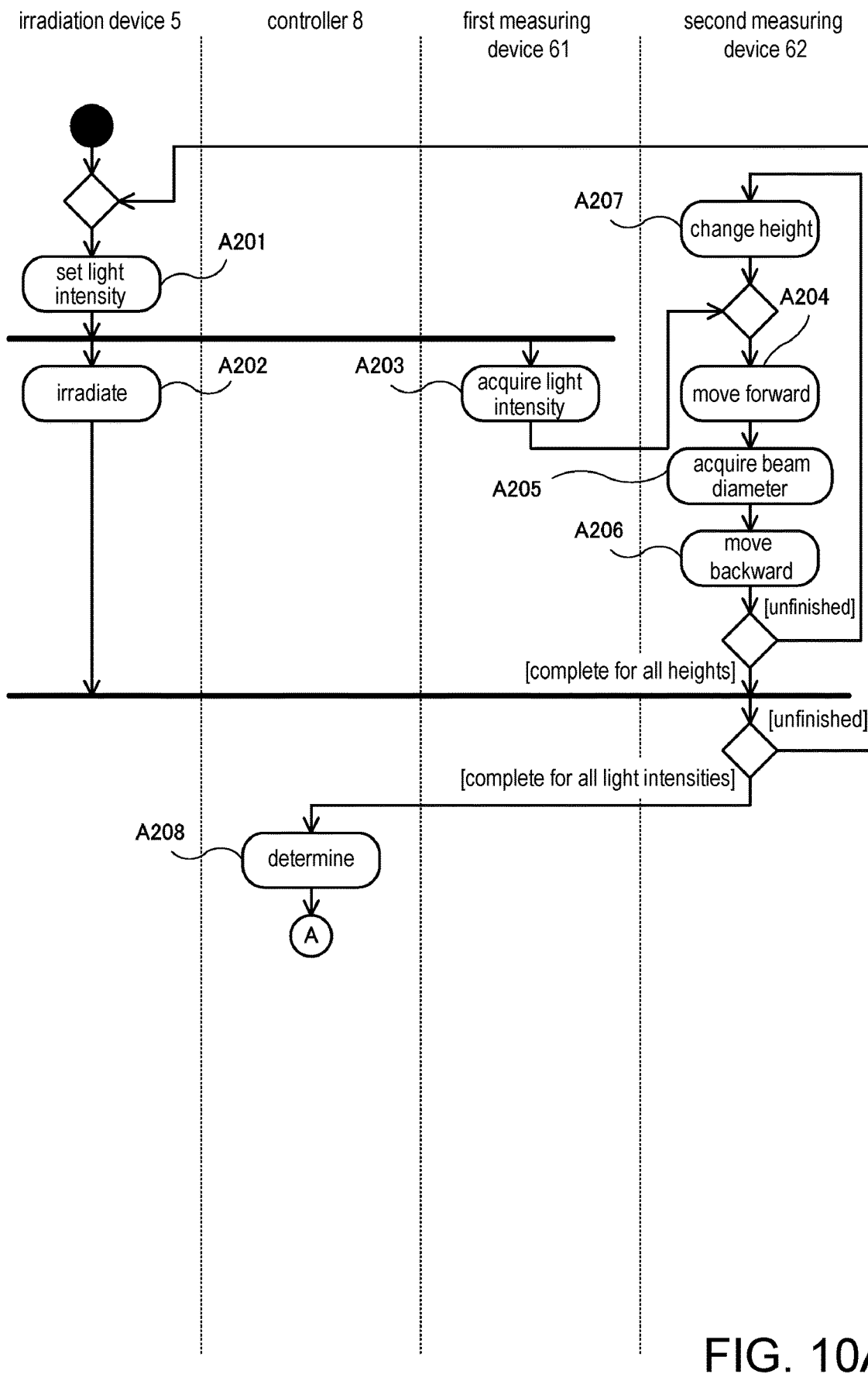
FIG. 10A is a first half of an activity diagram showing a flow of measurement of the laser beam.
Figure 10B:
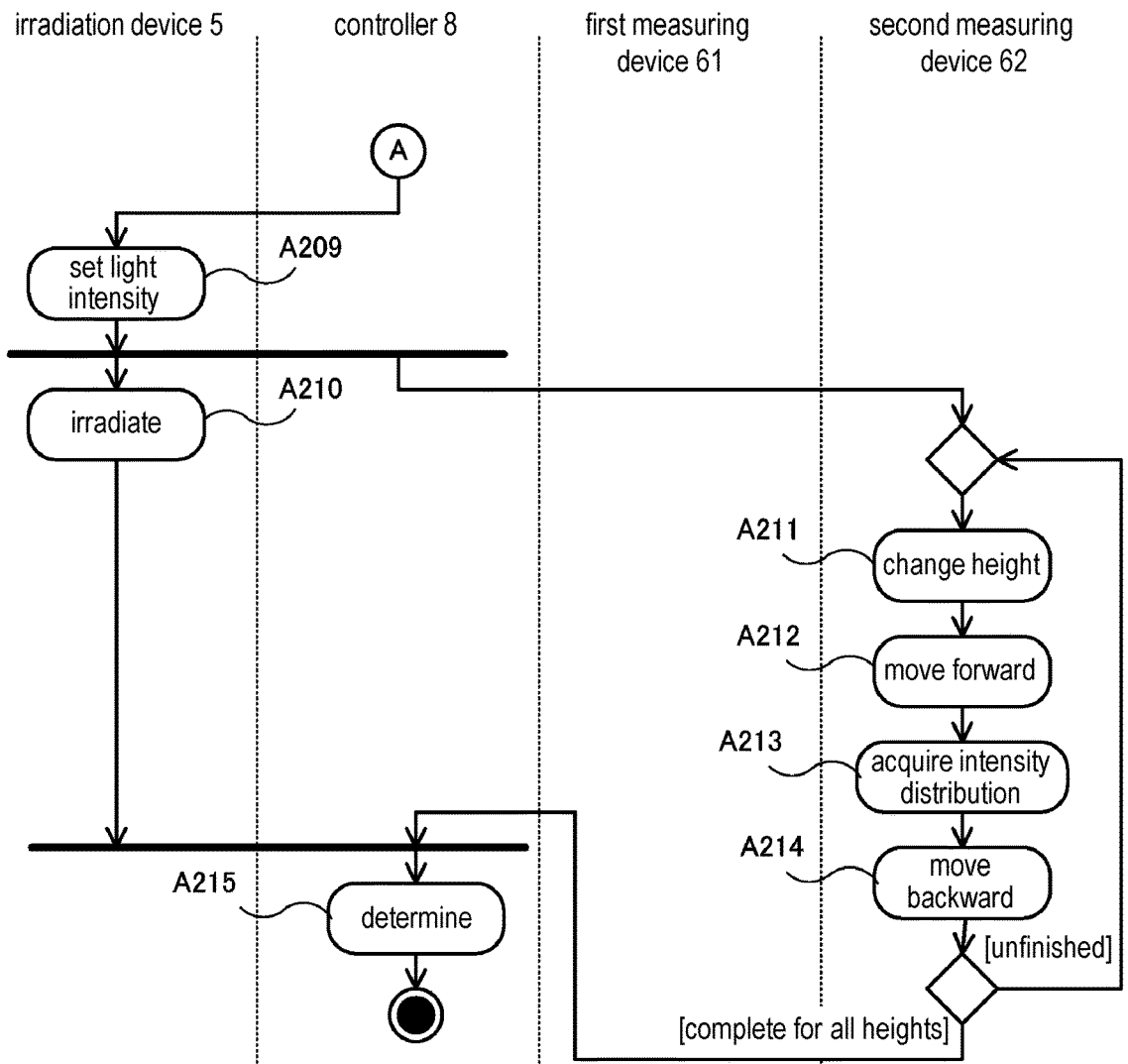
FIG. 10B is a second half of the activity diagram showing the flow of measurement of the laser beam.

Subsequently, the operation of the lamination molding apparatus 1 will be described with reference to FIG. 9, FIG. 10A, and FIG. 10B.

As the lamination molding apparatus 1 starts molding of a three-dimensional molded object, first, the molding table driving device 3 is operated to lower the molding table 2 to a position at which the height of a material layer M having a predetermined thickness can be formed (A101). Afterwards, in the formation of the material layer M, the molding table 2 is lowered by the thickness of one layer of the material layer M. Subsequently, the lamination molding apparatus 1 operates the material layer forming device 4 to form the material layer M on the molding region R (A102). The lamination molding apparatus 1 operates the irradiation device 5 to irradiate a laser beam L to a predetermined position of the material layer M to form a solidified layer S on the molding region R (A103). In parallel with the formation of the solidified layer S, the lamination molding apparatus 1 measures the temperature of the chamber window 12 by the temperature sensor 63 (A104) and determines a degree of contamination of the chamber window 12 (A105). The formation of the material layer M and the formation of the solidified layer S are repeated for a predetermined number of times.

At any timing during molding, for the laser beam L, the determination based on the measured value of the light intensity and the value of the beam diameter at a predetermined height or the value of the focal position, the determination based on the set value and the measured value of the light intensity, and the determination based on the intensity distribution are performed.

The lamination molding apparatus 1 operates the molding table driving device 3 to lower the molding table 2 to a position at which it does not interfere with the transportation of the first measuring device 61 (A106).

Subsequently, the lamination molding apparatus 1 performs setting so that the incident angle of the laser beam L irradiated by the irradiation device 5 is 90° with respect to the horizontal direction (A107). In addition, in the case where the second photodetector 621 is movable in the vertical direction and measurement is performed at the focal position of the laser beam L, the lamination molding apparatus 1 adjusts the focal position of the laser beam L so that the focal position is located within the movable range of the second photodetector 621 (A108).

On the other hand, the lamination molding apparatus 1 opens the first shutter 72 and the second shutter 75 (A109), and operates the first carrier 71 and the second carrier 74 to transport the first measuring device 61 and the second measuring device 62 to predetermined positions in the molding room 10 (A110). The first measuring device 61 is positioned at a position where the first photodetector 611 enters the path of the laser beam L. The second measuring device 62 is positioned so that the second photodetector 621 enters the path of the laser beam L when the arm 622 is advanced (see FIG. 5), and the second measuring device 62 including the second photodetector 621 is out of the path of the laser beam L when the arm 622 is retracted.

Next, the lamination molding apparatus 1 performs measurement of the laser beam L (A111). First, the determination based on the measured value of the light intensity and the value of the beam diameter at a predetermined height or the value of the focal position, and the determination based on the set value and the measured value of the light intensity are performed. If the light intensity is measured first, the arm 622 of the second measuring device 62 is initially positioned at a retracted position. The lamination molding apparatus 1 sets the light intensity of the laser beam L irradiated by the irradiation device 5 to a predetermined value (A201) and irradiates the laser beam L (A202). At this time, the outputted laser beam L is irradiated to the first photodetector 611. Accordingly, the first measuring device 61 acquires the measured value of the light intensity of the laser beam L (A203). Subsequently, the arm 622 of the second measuring device 62 is positioned at an advanced position (A204), and the laser beam L is irradiated to the second photodetector 621. Accordingly, the second measuring device 62 acquires the measured value of the beam diameter of the laser beam L (A205). At this time, with the laser beam L being irradiated, the second photodetector 621 may enter the irradiation path of the laser beam L.

In the case of acquiring the focal position, after the arm 622 is positioned at the retracted position (A206), the height of the second photodetector 621 is changed (A207), Then, the arm 622 is moved to the advanced position again, the laser beam L is irradiated to the second photodetector 621. The above procedure is repeated until acquiring the focal position. Accordingly, the second measuring device 62 acquires the value of the beam diameter at a predetermined height or the value of the focal position of the laser beam L. The light intensity of the laser beam L is set to a different value (A201), and the above procedure is repeated. When the slope of the linear function obtained from the relationship between the measured value of the light intensity and the value of the beam diameter at a predetermined height or the value of the focal position is out of a predetermined range, the lamination molding apparatus 1 determines that there is an abnormality in the optical system. Further, when the absolute value of a difference between the set value of the light intensity and the measured value of the light intensity exceeds a predetermined threshold value, the lamination molding apparatus 1 determines that there is an abnormality in the optical system (A208).

It is noted that when the determination based on the measured value of the light intensity and the value of the beam diameter at a predetermined height or the value of the focal position is performed, the focus shift amount needs to be saturated. Therefore, before the measurement of the laser beam L is performed by the second measuring device 62, it is desirable to allow the laser beam L to pass, for a sufficient time, through the optical component(s) where the thermal lens effect may occur. In this embodiment, before the measurement of the laser beam L is performed by the second measuring device 62, the laser beam L is continuously irradiated for about 1 to 2 minutes. The measurement of the light intensity of the laser beam L by the first measuring device 61 may be performed at this time.

Then, the determination based on the intensity distribution is performed. The lamination molding apparatus 1 sets the light intensity of the laser beam L irradiated by the irradiation device 5 to a predetermined value (A209), and irradiates the laser beam L (A210). On the other hand, the arm 622 of the second measuring device 62 is positioned at a predetermined height (A211), and the arm 622 is moved to the advanced position (A211). The laser beam L outputted accordingly is irradiated to the second photodetector 621. Accordingly, the second measuring device 62 acquires the value of the beam diameter and the intensity distribution at the current position of the second photodetector 621 (A213). In the case of acquiring the intensity distribution at a plurality of heights, after the arm 622 is positioned at the retracted position (A214), the arm 622 and thus the second photodetector 621 are set to a different height (A211), and the above procedure is repeated. When the intensity distribution does not fall within the predetermined reference range corresponding to the value of the beam diameter, the lamination molding apparatus 1 determines that there is an abnormality in the optical system (A215).

If the lamination molding apparatus 1 determines that there is an abnormality in the optical system, the molding is interrupted. If it is not determined that there is an abnormality in the optical system, the molding is continued. The lamination molding apparatus 1 operates the first carrier 71 and the second carrier 74 to carry the first measuring device 61 and the second measuring device 62 to the outside of the molding room (A112).

Afterwards, the lamination molding apparatus 1 closes the first shutter 72 and the second shutter 75 (A113). Next, the lamination molding apparatus 1 operates the molding table driving device 3 to raise the molding table 2 to the position before the measurement of the laser beam L (A114).

Then, the lamination molding apparatus 1 repeats these operations until the molding of the three-dimensional molded object is completed. The processes shown above may be performed in changed sequences or may be performed in parallel as long as the gist of the disclosure is not impaired.

What is claimed is:

1. A lamination molding apparatus comprising:
    a molding room having a molding region where a desired three-dimensional molded object is formed;
    a chamber covering the molding room;
    a chamber window provided on an upper surface of the chamber;
    a molding table provided in the molding region, wherein a material layer is formed on the molding table;
    a molding table driving device having an actuator which moves the molding table in a vertical direction;
    surrounding walls surrounding the molding table in a moving range of the molding table;
    an irradiation device provided above the chamber and comprising a laser source which outputs a laser beam based on a set value of a light intensity, and a scanner which scans the laser beam and irradiates the laser beam to the material layer through the chamber window to form a solidified layer;
    a measuring unit comprising a first measuring device having a first photodetector acquiring a measured value of the light intensity at a light detecting position of the laser beam, and a second measuring device having a second photodetector acquiring a value of a beam diameter at a light detecting position of the laser beam,
    wherein the measuring unit measures each of a plurality of laser beams outputted based on a plurality of set values of the light intensity during molding; and
    a controller connected to the measuring unit and determining that an abnormality has occurred when a slope of a linear function obtained from a relationship between the measured value of the light intensity and the value of the beam diameter at a predetermined height is out of a predetermined range, or when a slope of a linear function obtained from a relationship between the measured value of the light intensity and a value of a focal position obtained from the beam diameter is out of the predetermined range.

2. The lamination molding apparatus according to claim 1, wherein the controller determines that an abnormality has occurred when an absolute value of a difference between the set value of the light intensity and the measured value of the light intensity exceeds a predetermined threshold value.

3. The lamination molding apparatus according to claim 1, wherein the second photodetector acquires the value of the beam diameter and an intensity distribution at the light detecting position of the laser beam,
    the second measuring device measures the value of the beam diameter and the intensity distribution at one or more heights for a laser beam outputted based on a predetermined set value of the light intensity during molding, and
    the controller determines that an abnormality has occurred when the intensity distribution does not fall within a predetermined reference range corresponding to the value of the beam diameter.

4. The lamination molding apparatus according to claim 1, wherein the second photodetector is configured to be movable in the vertical direction.

5. The lamination molding apparatus according to claim 4, wherein the irradiation device further comprises a focus control unit having a movable lens which adjusts the focal position of the laser beam, and a lens actuator which moves the movable lens in an optical axis direction of the laser beam, wherein
    the focus control unit adjusts the focal position of the laser beam measured by the second measuring device to be within a vertical movable range of the second photodetector.

6. The lamination molding apparatus according to claim 1, further comprising:
    a carrier moving the measuring unit; and
    a shutter which is openable and closable and is provided at at least one of the chamber and the surrounding walls,
    wherein the controller
        opens the shutter and moves the carrier from outside of the molding room to inside of the molding room when performing measurement of the laser beam by the measuring unit, and
        moves the carrier from inside of the molding room to outside of the molding room and closes the shutter after the measurement of the laser beam performed by the measuring unit.

7. The lamination molding apparatus according to claim 1, wherein an incident angle of the laser beam measured by the measuring unit is 90° with respect to a horizontal direction.

8. The lamination molding apparatus according to claim 1, wherein the controller moves the molding table vertically downward when performing measurement of the laser beam by the measuring unit.

9. A method for producing a three-dimensional molded object, comprising:

measuring each of a plurality of laser beams outputted based on a plurality of set values of the light intensity during molding to acquire a measured value of the light intensity at a light detecting position and a value of a beam diameter at a light detecting position; and determining that an abnormality has occurred when a slope of a linear function obtained from a relationship between the measured value of the light intensity and the value of the beam diameter at a predetermined height is out of a predetermined range, or when a slope of a linear function obtained from a relationship between the measured value of the light intensity and a value of a focal position obtained from the beam diameter is out of the predetermined range.

10. The method for producing a three-dimensional molded object according to claim 9, further comprising:

determining that an abnormality has occurred when an absolute value of a difference between the set value of the light intensity and the measured value of the light intensity exceeds a predetermined threshold value.

11. The method for producing a three-dimensional molded object according to claim 9, further comprising:

measuring the value of the beam diameter and an intensity distribution at one or more heights for a laser beam outputted based on a predetermined set value of the light intensity during molding, and determining that an abnormality has occurred when the intensity distribution does not fall within a predetermined reference range corresponding to the value of the beam diameter.

12. The method for producing a three-dimensional molded object according to claim 9, further comprising:

moving a molding table vertically downward when measurement of the laser beam is performed.

* * * * *